United States Patent
Kang et al.

(10) Patent No.: US 9,845,536 B2
(45) Date of Patent: Dec. 19, 2017

(54) TOUCH SCREEN PANEL AND A METHOD OF MANUFACTURING THE SAME

(71) Applicant: SAMSUNG DISPLAY CO., LTD., Yongin, Gyeonggi-Do (KR)

(72) Inventors: Jae-Wook Kang, Gyeonggi-do (KR); Hyun-Jae Na, Seoul (KR)

(73) Assignee: SAMSUNG DISPLAY CO., LTD., Yongin, Gyeonggi-Do (KR)

( * ) Notice: Subject to any disclaimer, the term of this patent is extended or adjusted under 35 U.S.C. 154(b) by 15 days.

(21) Appl. No.: 14/693,344

(22) Filed: Apr. 22, 2015

(65) Prior Publication Data

US 2016/0147360 A1    May 26, 2016

(30) Foreign Application Priority Data

Nov. 20, 2014  (KR) .................. 10-2014-0162883

(51) Int. Cl.
  *G06F 3/041*  (2006.01)
  *C23F 1/02*  (2006.01)
  *G06F 3/044*  (2006.01)

(52) U.S. Cl.
  CPC ............. *C23F 1/02* (2013.01); *G06F 3/044* (2013.01); *G06F 2203/04103* (2013.01)

(58) Field of Classification Search
  CPC ...................................................... G06F 3/044
  See application file for complete search history.

(56) References Cited

U.S. PATENT DOCUMENTS

| 2011/0227858 | A1  | 9/2011  | An et al. |
| 2011/0279398 | A1* | 11/2011 | Philipp .................... G06F 3/044 345/174 |
| 2012/0135853 | A1* | 5/2012  | Amin ....................... C03C 3/091 501/66 |
| 2012/0194441 | A1* | 8/2012  | Frey ......................... G06F 3/041 345/173 |
| 2012/0313873 | A1* | 12/2012 | Bright ..................... G06F 3/044 345/173 |
| 2013/0202884 | A1* | 8/2013  | Park ....................... C09J 133/066 428/354 |
| 2015/0022739 | A1* | 1/2015  | Chen ....................... G06F 3/044 349/12 |

FOREIGN PATENT DOCUMENTS

| KR | 1020120080930 | 7/2012 |
| KR | 1020140003726 | 1/2014 |

* cited by examiner

*Primary Examiner* — Bruce H Hess
*Assistant Examiner* — Sathavaram I Reddy
(74) *Attorney, Agent, or Firm* — F. Chau & Associates, LLC (57) ABSTRACT

A touch screen panel includes a substrate and a transparent electrode. The transparent electrode is disposed on a display area of the substrate and includes an adhesion layer, a metal layer disposed on the adhesion layer and a protecting layer disposed on the metal layer. A thickness of the metal layer is about 150 Å to about 250 Å. A thickness of the adhesion layer or a thickness of the protecting layer is about 50 Å to about 140 Å.

14 Claims, 8 Drawing Sheets

TOUCH SCREEN PANEL AND A METHOD OF MANUFACTURING THE SAME

CROSS-REFERENCE TO RELATED APPLICATION

This application claims priority under 35 U.S.C. §119 to Korean Patent Application No. 10-2014-0162883, filed on Nov. 20, 2014, the disclosure of which is incorporated by reference herein in its entirety.

TECHNICAL FIELD

Exemplary embodiments of the inventive concept relate to a touch screen panel, and more particularly, to a touch screen panel including a transparent electrode.

DISCUSSION OF THE RELATED ART

Touch panels and touch screens are electronic visual displays that a user can control by touching the screen with one or more fingers or stylus pens. The touch screen is common in devices such as game consoles, personal computers, tablet computers and smartphones. They may also be found in digital appliances such as a personal digital assistant (PDA), and can be used in a variety of applications such as an automatic guide device which is used in airports or government offices.

SUMMARY

According to an exemplary embodiment of the inventive concept, a touch screen panel includes a substrate and a transparent electrode. The transparent electrode is disposed on a display area of the substrate and includes an adhesion layer, a metal layer disposed on the adhesion layer and a protecting layer disposed on the metal layer. A thickness of the metal layer is about 150 Å to about 250 Å. A thickness of the adhesion layer or a thickness of the protecting layer is about 50 Å to about 140 Å.

In an exemplary embodiment of the inventive concept, the adhesion layer and the protecting layer may include the same material.

In an exemplary embodiment of the inventive concept, a length of the adhesion layer may be substantially the same as a length of the protecting layer, and a width of the adhesion layer may be substantially the same as a width of the protecting layer.

In an exemplary embodiment of the inventive concept, the protecting layer may overlap an upper surface of the metal layer and a side surface of the metal layer.

In an exemplary embodiment of the inventive concept, the adhesion layer and the protecting layer may include indium tin oxide (ITO), zinc tin oxide (ZTO), gallium zinc oxide (GZO), a carbon nano tube (CNT) or graphene.

In an exemplary embodiment of the inventive concept, the metal layer may include aluminum (Al), gold (Au), silver (Ag), copper (Cu), chrome (Cr), molybdenum (Mo), iron (Fe), a molybdenum tungsten (MoW) alloy or nickel (Ni).

In an exemplary embodiment of the inventive concept, the transparent electrode may include a plurality of sensing patterns arranged on the substrate and a plurality of connecting patterns. Two sensing patterns may be connected to at least one of the connecting patterns.

In an exemplary embodiment of the inventive concept, at least one of the sensing patterns may have a rectangular shape, a diamond shape or a square shape.

In an exemplary embodiment of the inventive concept, the touch screen panel may further include a line connected the transparent electrode. The line may be disposed on a peripheral area adjacent to the display area of the substrate.

In an exemplary embodiment of the inventive concept the substrate may be a glass substrate including aluminosilicate or soda lime.

In an exemplary embodiment of the inventive concept, the substrate may be a flexible substrate including transparent plastic or transparent ceramic.

In an exemplary embodiment of the inventive concept, the touch screen panel may further include a passivation layer disposed on the transparent electrode.

According to an exemplary embodiment of the inventive concept, a method of manufacturing a touch screen panel includes forming a first transparent conductive film on a substrate. A metal film is formed on the first transparent conductive film. The first transparent conductive film and the metal film are patterned to form an adhesion layer and a metal layer disposed the adhesion layer. A second transparent conductive film is formed on the adhesion layer and the metal layer. The second transparent conductive film is patterned to form a protecting layer overlapping an upper surface and a side surface of the metal layer. A thickness of the metal layer is about 150 Å to about 250 Å, and a thickness of the adhesion layer or a thickness of the protecting layer is about 50 Å to about 140 Å.

In an exemplary embodiment of the inventive concept, when the first transparent conductive film and the metal film are patterned, a photo resist pattern may be formed on the metal film. The first transparent conductive film and the metal film may be etched by using the photo resist pattern as a mask.

In an exemplary embodiment of the inventive concept, when the second transparent conductive film is patterned, a photo resist pattern may be formed on the second transparent conductive film. The second transparent conductive film may be etched by using the photo resist pattern as a mask.

In an exemplary embodiment of the inventive concept, a length of the adhesion layer may be substantially the same as a length of the protecting layer, and a width of the adhesion layer may be substantially the same as a width of the protecting layer.

In an exemplary embodiment of the inventive concept, the first transparent conductive film and the second transparent conductive film may include indium tin oxide (ITO), zinc tin oxide (ZTO), gallium zinc oxide (GZO), a carbon nano tube (CNT) or graphene.

In an exemplary embodiment of the inventive concept, the metal layer may include aluminum (Al), gold (Au), silver (Ag), copper (Cu), chrome (Cr), molybdenum (Mo), iron (Fe), a molybdenum tungsten (MoW) alloy or nickel (Ni).

In an exemplary embodiment of the inventive concept, the substrate may be a flexible substrate including transparent plastic or transparent ceramic.

In an exemplary embodiment of the inventive concept, the metal layer may be patterned to form a transparent electrode that has a rectangular shape, a diamond shape or a square shape.

According to an exemplary embodiment of the inventive concept, a touch screen panel includes a substrate and a transmitting electrode. The transmitting electrode includes an adhesion layer disposed directly on the substrate, a metal layer disposed directly on the adhesion layer and a protecting layer disposed directly on the metal layer. A thickness of the metal layer is about 200 Å and a thickness of each of the adhesion layer and the protecting layer is about 70 Å.

In an exemplary embodiment of the inventive concept, the transmitting electrode may function as a line layer in a peripheral area of the touch screen panel, and the line layer may output an electric signal generated from another transparent electrode.

In an exemplary embodiment of the inventive concept, the adhesion layer may include indium tin oxide (ITO), the metal layer may include silver (Ag) and the protecting layer may include indium tin oxide (ITO).

BRIEF DESCRIPTION OF THE DRAWINGS

The above and other features of the inventive concept will become more apparent by describing in detail exemplary embodiments thereof with reference to the accompanying drawings, in which.

DETAILED DESCRIPTION OF THE EMBODIMENTS

Hereinafter, exemplary embodiments of the inventive concept will be explained in detail with reference to the accompanying drawings.

Figure 1:
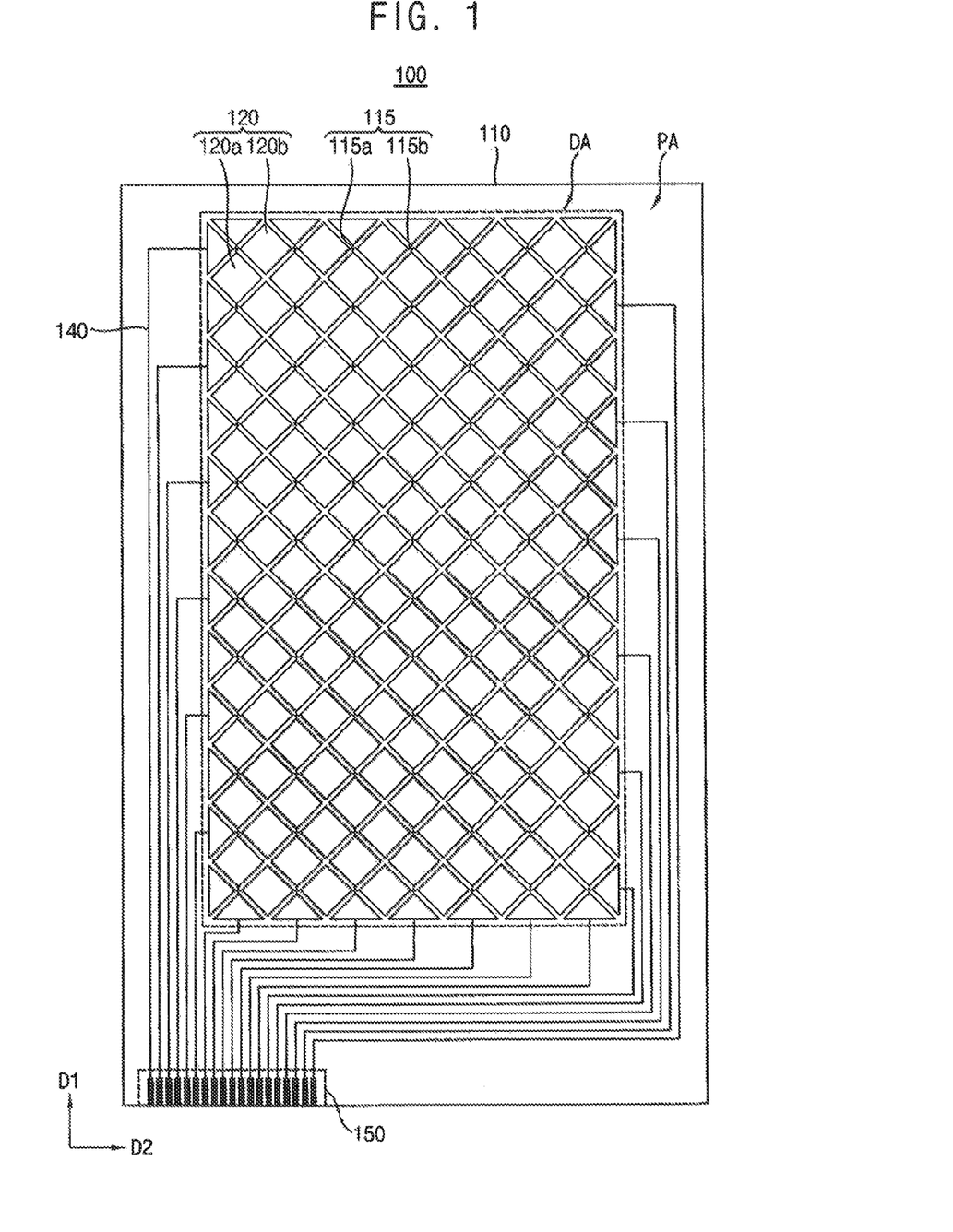
FIG. 1 is a plan view illustrating a touch screen panel in accordance with an exemplary embodiment of the inventive concept.
Figure 2:
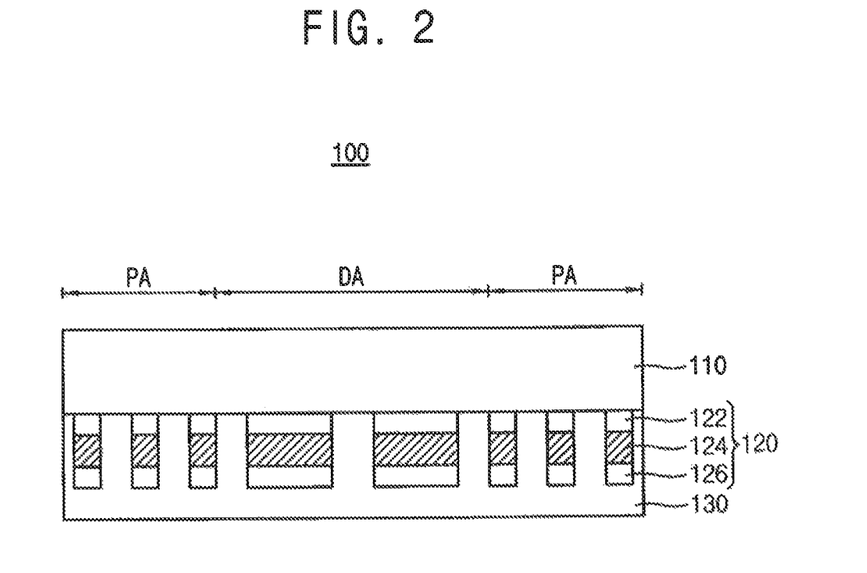
FIG. 2 is a cross-sectional view illustrating the touch screen panel of FIG. 1 in accordance with an exemplary embodiment of the inventive concept.

FIG. 1 is a plan view illustrating a touch screen panel in accordance with an exemplary embodiment of the inventive concept. FIG. 2 is a cross-sectional view illustrating the touch screen panel of FIG. 1 in accordance with an exemplary embodiment of the inventive concept.

Referring to FIGS. 1 and 2, a touch screen panel 100 includes a base substrate 110, a plurality of transparent electrodes 120 disposed on the base substrate 110, a plurality of connecting patterns 115 and external lines 140. The transparent electrodes 120 are connected to the connecting patterns 115. The transparent electrodes 120 are connected to an external driving circuit through a pad part 150 of the external lines 140. For example, a first direction D1 is perpendicular to a second direction D2.

The base substrate 110 includes a display area DA which may be touched by a user's finger or contacted with a stylus pen and a peripheral area PA surrounding the display area DA.

For example, the base substrate 110 may be a glass substrate including aluminosilicate or soda lime.

The transparent electrodes 120 are disposed in the display area DA and the peripheral area PA. The transparent electrodes 120 serve as a transparent electrode layer in the display area DA. The transparent electrodes 120 serve as a line layer in the peripheral area PA. The line layer outputs an electric signal generated from the transparent electrodes 120 to an external chip.

The transparent electrodes 120 may sense a variation of capacitance according to an input action or an event by a user. For example, the input action or event by a user may include the user's finger touching the touch screen panel 100 or the user causing a stylus pen to contact the touch screen panel 100. The transparent electrodes 120 may have a rectangular shape, a diamond shape or a square shape. The transparent electrodes 120 may have various shapes. For example, the shape of the transparent electrodes 120 may depend on a shape of the touch screen panel 100.

The transparent electrodes 120 include first sensing patterns 120a and second sensing patterns 120b for detecting a location of an input made to the touch screen panel 100. The first sensing patterns 120a are arranged in the first direction D1, and the second sensing patterns 120b are arranged in the second direction D2 which is different from the first direction D1. For example, the first direction D1 may be substantially perpendicular to the second direction D2.

The plurality of connecting patterns 115 include first connecting patterns 115a that are arranged in the first direction D1 and second connecting patterns 115b that are arranged in the second direction D2.

The first sensing pattern 120a is connected to the external lines 140 by the first connecting pattern 115a in the first direction D1. This is shown by the external lines 140 connected between the pad part 150 and the first connecting patterns 115a at the bottom of the touch screen panel 100.

The second sensing pattern 120b is disposed between the first sensing patterns 120a such that the first sensing patterns 120a and the second sensing pattern 120b are insulated. The second sensing pattern 120b is connected to the external lines 140 by the second connecting pattern 115b in the second direction D2. This is shown by the external lines 140 connected between the pad part 150 and the second connecting patterns 115b at the sides of the touch screen panel 100.

The first sensing pattern 120a and the second sensing pattern 120b are disposed on the same layer. A passivation layer 130 is disposed between the first sensing pattern 120a and the second sensing pattern 120b, and thus the first sensing pattern 120a and the second sensing pattern 120b are insulated.

The external lines 140 are disposed in the peripheral area PA of the base substrate 110. The transparent electrodes 120 are connected to an external driving circuit such as a location detecting circuit through the external lines 140 and the pad part 150.

The touch screen panel 100 is a capacitance type panel. For example, when an object such as hands, a pen, etc. is in contact with the touch screen panel 100, a variation of capacitance is transferred to a driving circuit through the external lines 140 and the pad part 150 from the contact location. The variation of capacitance is transferred as an electric signal, and the contact location is identified.

The transparent electrodes 120 include an adhesion layer 122, a metal layer 124 and a protecting layer 126.

The adhesion layer 122 is disposed on the base substrate 110. For example, the adhesion layer 122 may include indium tin oxide (ITO), zinc tin oxide (ZTO), gallium zinc oxide (GZO), a carbon nano tube (CNT) or graphene. The adhesion layer 122 may include mostly indium tin oxide (ITO).

For example, a thickness of the adhesion layer 122 may be about 50 Å to about 140 Å. A thickness of the adhesion layer 122 may be about 70 Å.

For example, when a thickness of the adhesion layer 122 is smaller than about 50 Å, the adhesion layer 122 may not be properly formed because an etch skew is changed. When a thickness of the adhesion layer 122 is greater than about 140 Å, an optical characteristic of the touch screen panel 100 may be degraded because uniformity of the adhesion layer 122 is changed.

The adhesion layer 122 serves to increase adhesion between the base substrate 110 and the metal layer 124.

The metal layer 124 is disposed on the adhesion layer 122. The metal layer 124 may include aluminum (Al), gold (Au), silver (Ag), copper (Cu), chrome (Cr), molybdenum (Mo), iron (Fe), a molybdenum tungsten (MoW) alloy or nickel (Ni). For example, the metal layer 124 may include mostly silver (Ag).

A thickness of the metal layer 124 may be about 150 Å to about 250 Å. For example, a thickness of the metal layer 124 may be about 200 Å. The metal layer 124 may have transmittance.

The protecting layer 126 is disposed on the metal layer 124. The protecting layer 126 may include the same material as the adhesion layer 122. For example, the protecting layer 126 may include indium tin oxide (ITO), zinc tin oxide (ZTO), gallium zinc oxide (GZO), a carbon nano tube (CNT) or graphene. The protecting layer 126 may include mostly indium tin oxide (ITO).

For example, a thickness of the protecting layer 126 may be about 50 Å to about 140 Å. A thickness of the protecting layer 126 may be about 70 Å.

For example, when a thickness of the protecting layer 126 is smaller than about 50 Å, the adhesion layer 122 may not be properly formed because an etch skew is changed. When a thickness of the protecting layer 126 is greater than about 140 Å, an optical characteristic of the touch screen panel 100 may be degraded because uniformity is changed.

The protecting layer 126 serves to prevent corrosion of metals of the metal layer 124.

A length of the adhesion layer 122 may be substantially the same as a length of the metal layer 124. A length of the adhesion layer 122 may be substantially the same as a length of the protecting layer 126. A length of the protecting layer 126 may be substantially the same as a length of the metal layer 124. A width of the adhesion layer 122 may be substantially the same as a width of the metal layer 124. A width of the adhesion layer 122 may be substantially the same as a width of the protecting layer 126. A width of the protecting layer 126 may be substantially the same as a width of the metal layer 124. A length of the adhesion layer 122, the metal layer 124 or the protecting layer 126 may be about 0.1 μm about to 100 μm. A width of the adhesion layer 122, the metal layer 124 or the protecting layer 126 may be about 0.1 μM about to 100 μm.

The adhesion layer 122, the metal layer 124 and the protecting layer 126 may be arranged to have a mesh structure.

The transparent electrodes 120 may have transmittance and may include a multi-layered structure including the adhesion layer 122, the metal layer 124 and the protecting layer 126. For example, the adhesion layer 122 may have a thickness of about 70 Å, the metal layer 124 may have a thickness of about 200 Å and the protecting layer 126 may have a thickness of about 70 Å. The multi-layered structure may have a sheet resistance of about 3.78 ohm/square.

Thus, the transparent electrodes 120 may have a relatively low sheet resistance and may have transmittance, the transparent electrodes 120 may serve as a transparent electrode layer of the display area DA of the touch screen panel 100 and may serve as a line layer of the peripheral area PA of the touch screen panel 100.

The passivation layer 130 may be disposed on the transparent electrodes 120. The passivation layer 130 may serve to prevent corrosion of metals of the metal layer 124 of the transparent electrodes 120. The passivation layer 130 may include an inorganic material such as silicon oxide (SiOx) or silicon nitride (SiNx), but is not limited thereto.

Figure 3:
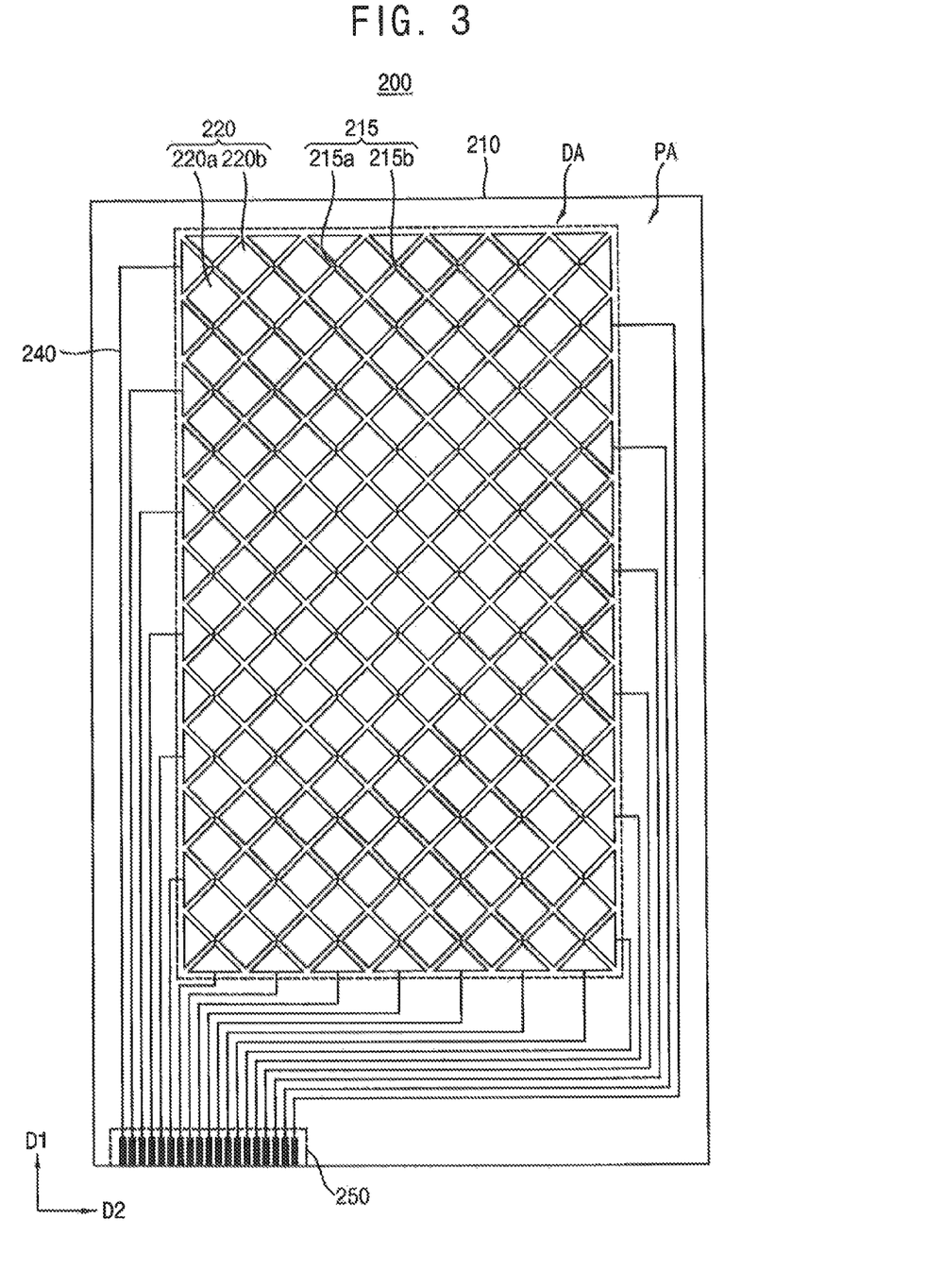
FIG. 3 is a plan view illustrating a touch screen panel in accordance with an exemplary embodiment of the inventive concept.
Figure 4:
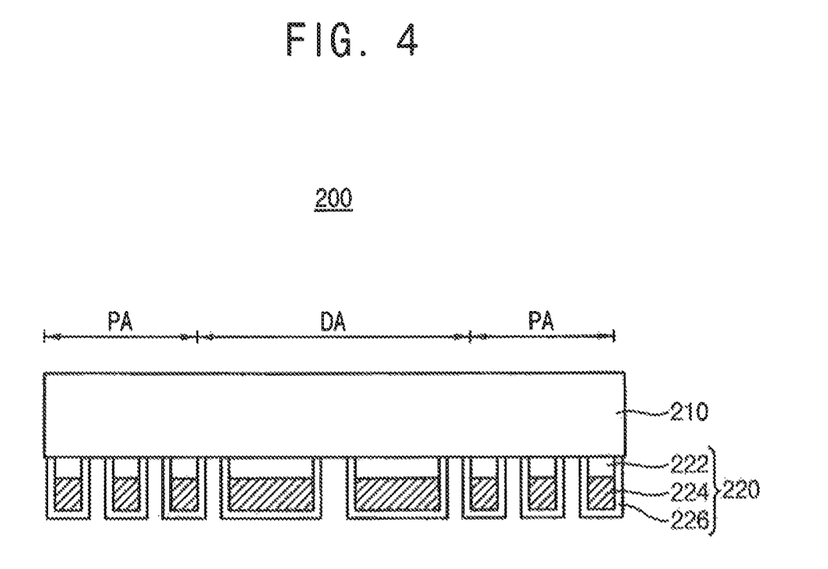
FIG. 4 is a cross-sectional view illustrating the touch screen panel of FIG. 4 in accordance with an exemplary embodiment of the inventive concept.

FIG. 3 is a plan view illustrating a touch screen panel in accordance with an exemplary embodiment of the inventive concept. FIG. 4 is a cross-sectional view illustrating the touch screen panel of FIG. 4 in accordance with an exemplary embodiment of the inventive concept.

Referring to FIGS. 3 and 4, a touch screen panel 200 includes a base substrate 210, a plurality of transparent electrodes 220 disposed on the base substrate 210, a plurality of connecting patterns 215 and external lines 240. The transparent electrodes 220 are connected to the connecting patterns 215. The transparent electrodes 220 are connected to an external driving circuit through a pad part 250 of the external lines 240. For example, a first direction D1 is perpendicular to a second direction D2.

For example, the base substrate 210 may be a flexible substrate comprising transparent plastic or transparent ceramic.

For example, the transparent plastic and the transparent ceramic may include a polyimide type resin, an acrylic type resin, a polyacrylate type resin, a polycarbonate type resin, a polyether type resin, a polyethylene terephthalate type resin, a sulfonic acid type resin, etc.

The base substrate 210 includes a display area DA which may be touched by a user's finger or contacted with a stylus pen and a peripheral area PA surrounding the display area DA.

The transparent electrodes 220 are disposed in the display area DA and the peripheral area PA. The transparent electrodes 220 serve as a transparent electrode layer in the display area DA. The transparent electrodes 220 serves as a line layer in the peripheral area PA. The transparent electrode 220 output an electric signal generated from the transparent electrodes 220 to an external chip.

The transparent electrodes 220 may sense a variation of capacitance according to an input action or an event by a user. For example, the input action or event by a user may include the user's finger touching the touch screen panel 200 or the user causing a stylus pen to contact the touch screen panel 200. The transparent electrodes 220 may have a rectangular shape, a diamond shape or a square shape. The transparent electrodes 220 may have various shapes. For example, the shape of the transparent electrodes 220 may depend on a shape of the touch screen panel 200.

The transparent electrodes 220 include first sensing patterns 220a and second sensing patterns 220b for detecting a location of an input made to the touch screen panel 200. The first sensing patterns 220a are arranged in the first direction D, and the second sensing patterns 220b are arranged in the second direction D2 which is different from the first direction D1. For example, the first direction D1 may be substantially perpendicular to the second direction D2.

The plurality of connecting patterns 215 include first connecting patterns 215a that are arranged in the first direction D1 and second connecting patterns 215b that are arranged in the second direction D2. The first connecting patterns 215a are connected to the first sensing patterns 220a. The second connecting patterns 215b are connected to the second sensing patterns 220b.

The first sensing pattern 220a is connected to the external lines 240 by the first connecting pattern 215a in the first direction D1. This is shown by the external lines 240 connected between the pad part 250 and the first connecting patterns 215a at the bottom of the touch screen panel 200.

The second sensing pattern 220b is disposed between the first sensing patterns 220a such that the first sensing patterns 220a and the second sensing pattern 220b are insulated. The second sensing pattern 220b is connected to the external lines 240 by the second connecting pattern 215b in the second direction D2. This is shown by the external lines 240 connected between the pad part 250 and the second connecting patterns 215b at the sides of the touch screen panel 200.

The first sensing pattern 220a and the second sensing pattern 220b are disposed on the same layer. The transparent electrodes 220 include an adhesion layer 222, a metal layer 224 and a protecting layer 226. The protecting layer 226 is disposed between the first sensing pattern 220a and the second sensing pattern 220b. Thus, the protecting layer 226 may protect a metal layer of the transparent electrodes 220.

The external lines 240 are disposed in the peripheral area PA of the base substrate 210. The transparent electrodes 220 are connected to an external driving circuit such as a location detecting circuit through the external lines 240 and the pad part 250.

The touch screen panel 200 is a capacitance type panel. For example, when an object such as hands, a pen, etc. is in contact with the touch screen panel 200, a variation of capacitance is transferred to a driving circuit through the external lines 240 and the pad part 250 from the contact location. The variation of capacitance is transferred as an electric signal, and the contact location is identified.

The transparent electrodes 220 include the adhesion layer 222, the metal layer 224 and the protecting layer 226.

The adhesion layer 222 is disposed on the base substrate 210. For example, the adhesion layer 222 may include indium tin oxide (ITO), zinc tin oxide (ZTO), gallium zinc oxide (GZO), a carbon nano tube (CNT) or graphene. The adhesion layer 222 may include mostly indium tin oxide (ITO).

For example, a thickness of the adhesion layer 222 may be about 50 Å to about 140 Å. A thickness of the adhesion layer 222 may be about 70 Å.

For example, when a thickness of the adhesion layer 222 is smaller than about 50 Å, the adhesion layer 222 may not be properly formed because an etch skew is changed. When a thickness of the adhesion layer 222 is greater than about 140 Å, an optical characteristic of the touch screen panel 200 may be degraded because uniformity of the adhesion layer 222 is changed.

The adhesion layer 222 serves to increase adhesion between the base substrate 210 and the metal layer 224.

The metal layer 224 is disposed on the adhesion layer 222. Each side surface of the metal layer 224 is exposed. For example, the metal layer 224 may include aluminum (Al), gold (Au), silver (Ag), copper (Cu), chrome (Cr), molybdenum (Mo), iron (Fe), a molybdenum tungsten (MoW) alloy or nickel (Ni). For example, the metal layer 224 may include mostly silver (Ag).

A thickness of the metal layer 224 may be about 150 Å to about 250 Å. For example, a thickness of the metal layer 224 may be about 200 Å. The metal layer 224 may have transmittance.

The protecting layer 226 is disposed on the metal layer 224. The protecting layer 226 covers an upper surface of the metal layer 224, a side surface of the metal layer 224 and a side surface of the adhesion layer 222 which is disposed in the display area DA and the peripheral area PA. The protecting layer 226 is disposed between the first sensing pattern 220a and the second sensing pattern 220b. Thus, the protecting layer 226 may serve to prevent corrosion of metals of the metal layer 224.

The protecting layer 226 may include the same material as the adhesion layer 222. For example, the protecting layer 226 may include indium tin oxide (ITO), zinc tin oxide (ZTO), gallium zinc oxide (GZO), a carbon nano tube (CNT) or graphene. The protecting layer 226 may include mostly indium tin oxide (ITO).

For example, a thickness of the protecting layer 226 may be about 50 Å to about 140 Å. A thickness of the protecting layer 226 may be about 70 Å.

For example, when a thickness of the protecting layer 226 is smaller than about 50 Å, the protecting layer 226 may not be properly formed because an etch skew is changed. When a thickness of the protecting layer 226 is greater than about 140 Å, an optical characteristic of the touch screen panel 200 may be degraded because uniformity of the protecting layer 226 is changed.

A length of the adhesion layer 222 may be substantially the same as a length of the metal layer 224. A length of the adhesion layer 222 may be substantially the same as a length of the protecting layer 226. A length of the protecting layer 226 may be substantially the same as a length of the metal layer 224. A width of the adhesion layer 222 may be substantially the same as a width of the metal layer 224. A width of the adhesion layer 222 may be substantially the same as a width of the protecting layer 226. A width of the protecting layer 226 may be substantially the same as a width of the metal layer 224. A length of the adhesion layer 222, the metal layer 224 or the protecting layer 226 may be about 0.1 μm about to 100 μm. A width of the adhesion layer 222, the metal layer 224 or the protecting layer 226 may be about 0.1 μm about to 100 μm.

The adhesion layer 222, the metal layer 224 and the protecting layer 226 may be arranged to have a mesh structure.

The transparent electrodes 220 may have transmittance and may include a multi-layered structure including the adhesion layer 222, the metal layer 224 and the protecting layer 226. For example, the adhesion layer 222 may have a thickness of about 70 Å, the metal layer 224 may have a thickness of about 200 Å and the protecting layer 226 may have a thickness of about 70 Å. The multi-layered structure may have a sheet resistance of about 3.78 ohm/square.

Thus, the transparent electrodes 220 may have a relatively low sheet resistance and may have transmittance, the transparent electrodes 220 may serve as a transparent electrode layer of the display area DA of the touch screen panel 200 and may serve as a line layer of the peripheral area PA of the touch screen panel 200.

FIGS. 5A to 5D are cross-sectional views for describing a method of manufacturing the touch screen panel 100 of FIG. 1 in accordance with an exemplary embodiment of the inventive concept.

Figure 5A:
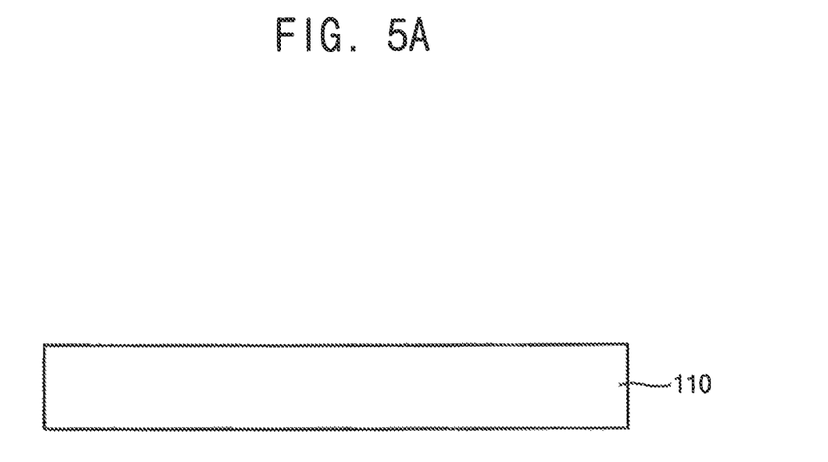
FIGS. 5A, 5B, 5C and 5D are cross-sectional views for describing a method of manufacturing the touch screen panel of FIG. 1 in accordance with an exemplary embodiment of the inventive concept.

Referring to FIG. 5A, the base substrate 110 is provided. For example, the base substrate 110 may be a glass substrate including aluminosilicate or soda lime.

The base substrate 110 includes a display area DA for touch by users and a peripheral area PA surrounding the display area DA.

Figure 5B:
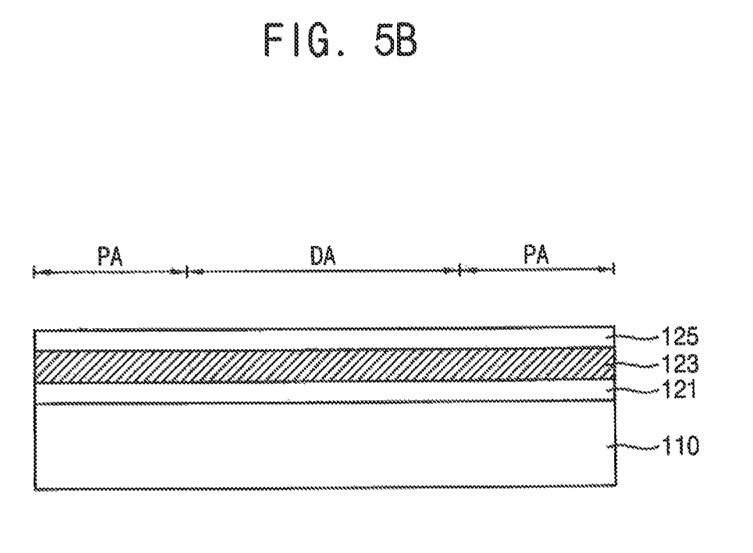

Referring to FIG. 5B, a first transparent conductive film 121, a metal film 123 and a second transparent conductive film 125 are formed. The first transparent conductive film 121, the metal film 123 and the second transparent conductive film 125 may be formed by a thin film deposition process using a sputtering process.

The sputtering process may proceed at low temperature, and thus thermal deformation of the base substrate 110 may be prevented.

The first transparent conductive film 121, the metal film 123 and the second transparent conductive film 125 may be formed by a screen printing process.

The first transparent conductive film 121 may include the same material as the second transparent conductive film 125. For example, the first transparent conductive film 121 may include indium tin oxide (ITO), zinc tin oxide (ZTO), gallium zinc oxide (GZO), a carbon nano tube (CNT) or graphene. The first transparent conductive film 121 and the second transparent conductive film 125 may include mostly indium tin oxide (ITO).

A thickness of the first transparent conductive film 121 and the second transparent conductive film 125 may be about 50 Å to about 140 Å. A thickness of the first transparent conductive film 121 and a thickness of the second transparent conductive film 125 may be about 70 Å.

The metal film 123 may include aluminum (Al), gold (Au), silver (Ag), copper (Cu), chrome (Cr), molybdenum (Mo), iron (Fe), a molybdenum tungsten (MoW) alloy or nickel (Ni). For example, the metal film 123 may include mostly silver (Ag).

A thickness of the metal film 123 may be about 150 Å to about 250 Å. For example, a thickness of the metal film 123 may be about 200 Å. The metal film 123 may have transmittance.

Figure 5C:
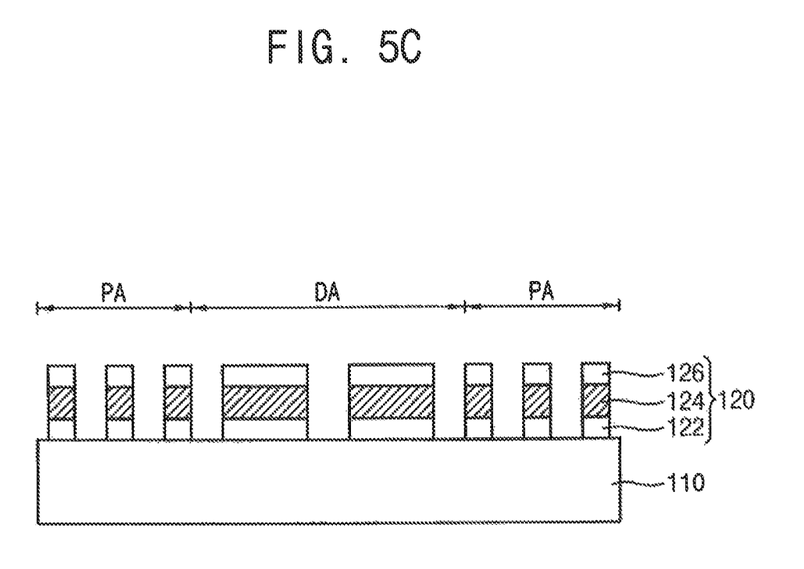

Referring to FIG. 5C, the first transparent conductive film 121, the metal film 123 and the second transparent conductive film 125 are patterned to form the adhesion layer 122, the metal layer 124 and the protecting layer 126 on the base substrate 110.

The transparent electrodes 120 may be formed by a photolithography process. A photo resist pattern is formed on the base substrate 110. The first transparent conductive film 121, the metal film 123 and the second transparent conductive film 125 are etched by using the photo resist pattern as a mask. Thus, the transparent electrodes 120 including the adhesion layer 122, the metal layer 124 and the protecting layer 126 are formed. The transparent electrodes 120 may serve as a transparent electrode layer in the display area DA and may serve as a line layer in the peripheral area PA.

The transparent electrodes 120 may sense a variation of capacitance according to an input action or an event by a user. The transparent electrodes 120 may have a rectangular shape, a diamond shape or a square shape. The transparent electrodes 120 may have various shapes. For example, the shape of the transparent electrode 120 may depend on a shape of the touch screen panel 100.

Figure 5D:
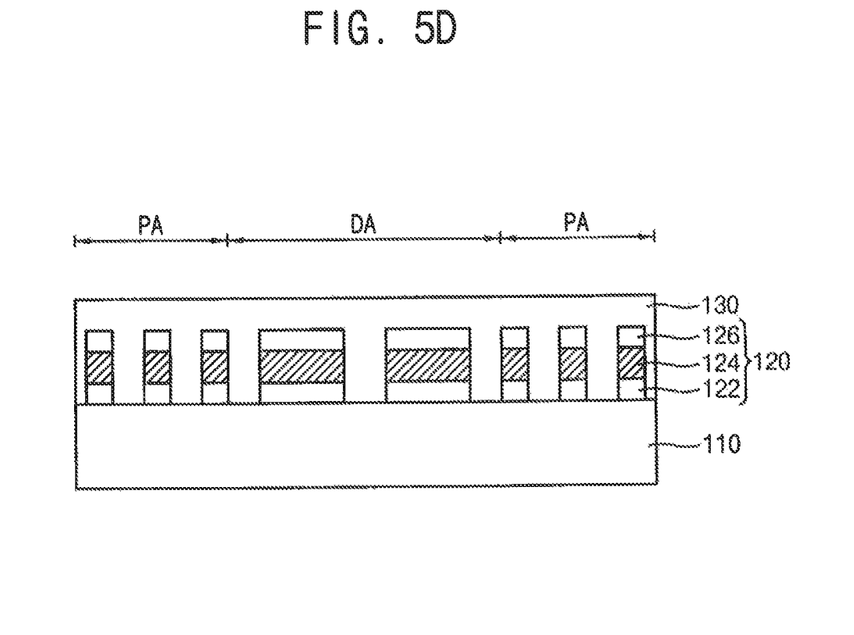

Referring to FIG. 5D, the passivation layer 130 is formed on the transparent electrodes 120. The passivation layer 130 may include an inorganic material such as silicon oxide (SiOx) or silicon nitride (SiNx), but is not limited thereto.

FIGS. 6A to 6E are cross-sectional views for describing a method of manufacturing the touch screen panel 200 of FIG. 3 in accordance with an exemplary embodiment of the inventive concept.

Figure 6A:
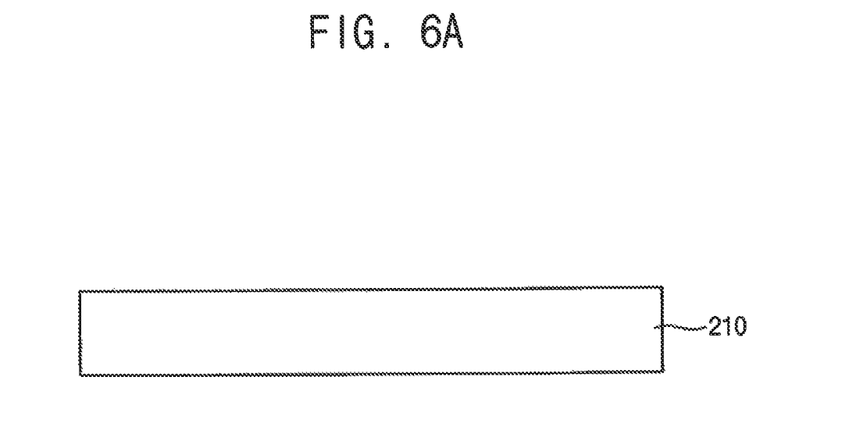
FIGS. 6A, 6B, 6C, 6D and 6E are cross-sectional views for describing a method of manufacturing the touch screen panel of FIG. 3 in accordance with an exemplary embodiment of the inventive concept.

Referring to FIG. 6A, the base substrate 210 is provided. For example, the base substrate 210 may be a flexible substrate comprising transparent plastic or transparent ceramic.

For example, the transparent plastic and the transparent ceramic may include a polyimide type resin, an acrylic type resin, a polyacrylate type resin, a polycarbonate type resin, a polyether type resin, a polyethylene terephthalate type resin, a sulfonic acid type resin, etc.

Figure 6B:
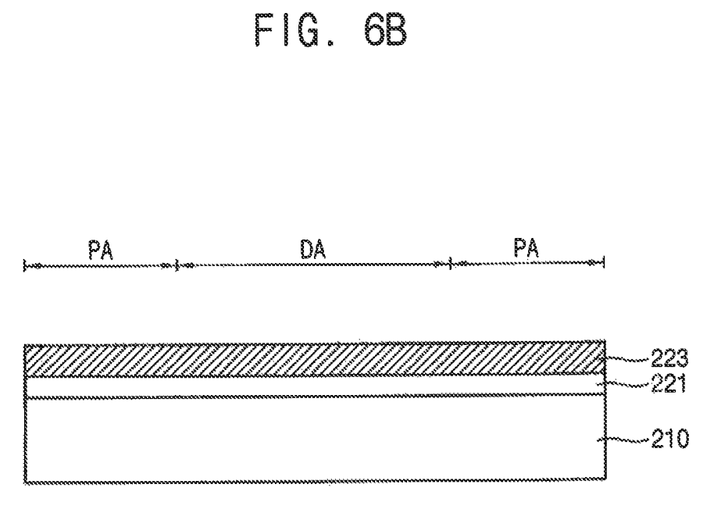

Referring to FIG. 6B, a first transparent conductive film 221 and a metal film 223 are formed.

The first transparent conductive film 221 and the metal film 123 may be formed by a thin film deposition process using a sputtering process.

The sputtering process may proceed at low temperature, and thus thermal deformation of the base substrate 210 may be prevented.

The first transparent conductive film 221 and the metal film 223 may be formed by a screen printing process.

The first transparent conductive film 221 may include metal oxide. For example, the first transparent conductive film 221 may include indium tin oxide (ITO), zinc tin oxide (ZTO), gallium zinc oxide (GZO), a carbon nano tube (CNT) or graphene. The first transparent conductive film 221 may include mostly indium tin oxide (ITO).

A thickness of the first transparent conductive film 221 may be about 50 Å to about 140 Å. A thickness of the first transparent conductive film 221 may be about 70 Å.

The metal film 223 may include aluminum (Al), gold (Au), silver (Ag), copper (Cu), chrome (Cr), molybdenum (Mo), iron (Fe), a molybdenum tungsten (MoW) alloy or nickel (Ni). For example, the metal film 223 may include mostly silver (Ag).

A thickness of the metal film 223 may be about 150 Å to about 250 Å. For example, a thickness of the metal film 223 may be about 200 Å.

Figure 6C:
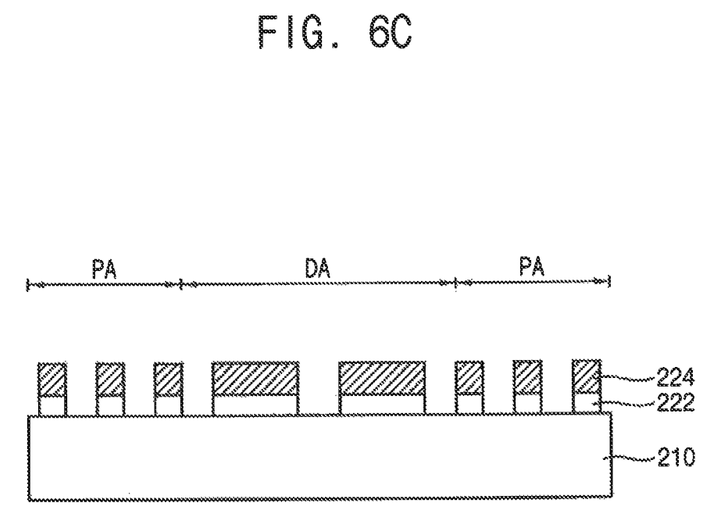

Referring to FIG. 6C, the first transparent conductive film 221 and the metal film 123 are patterned to form the adhesion layer 222 and the metal layer 224 on the base substrate 210.

A photo resist pattern is formed on the base substrate 210. The first transparent conductive film 221 and the metal film 223 are etched by using the photo resist pattern as a mask. Thus, the adhesion layer 222 and the metal layer 224 are formed in the display area DA and the peripheral area PA.

Figure 6D:
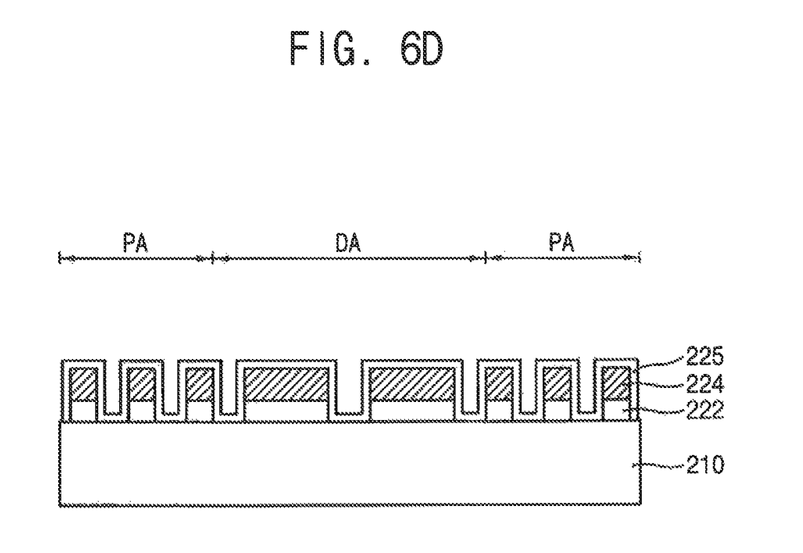

Referring to FIG. 6D, the second transparent conductive film 225 is formed on the adhesion layer 222 and the metal layer 224.

The second transparent conductive film 225 may include the same material as the first transparent conductive film 221. For example, the second transparent conductive film 225 may include indium tin oxide (ITO), zinc tin oxide (ZTO), gallium zinc oxide (GZO), a carbon nano tube (CNT) or graphene. The second transparent conductive film 225 may include mostly indium tin oxide (ITO).

A thickness of the second transparent conductive film 225 may be about 50 Å to about 140 Å. A thickness of the second transparent conductive film 225 may be about 70 Å.

Figure 6E:
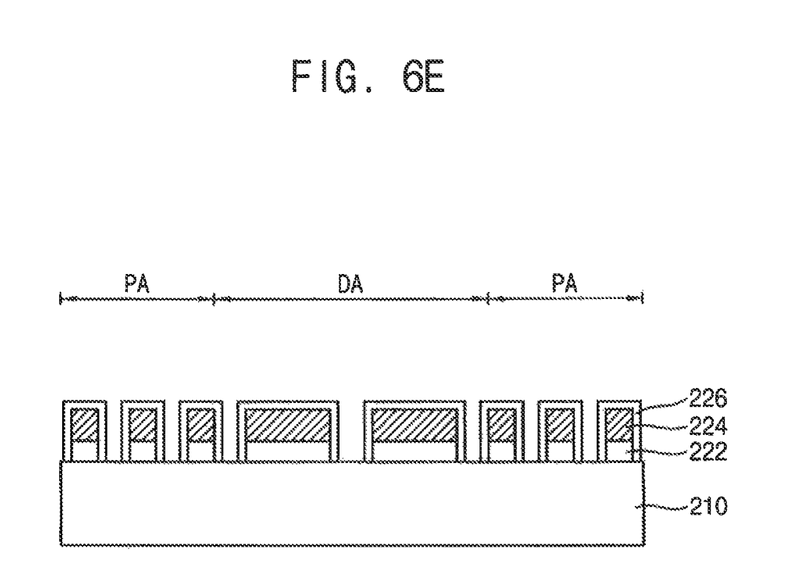

Referring to FIG. 6E, a photo resist pattern is formed on the adhesion layer 222 and the metal layer 224. The second transparent conductive film 225 is etched by using the photo resist pattern as a mask. Thus, the protecting layer 226 is formed. The protecting layer 226 covers an upper surface of the metal layer 224 and a side surface of the metal layer 224. Thus, the protecting layer 226 may serve to prevent corrosion of metals of the metal layer 224.

A length of the adhesion layer 222 may be substantially the same as a length of the metal layer 224. A length of the adhesion layer 222 may be substantially the same as a length of the protecting layer 226. A length of the protecting layer 226 may be substantially the same as a length of the metal layer 224. A width of the adhesion layer 222 may be substantially the same as a width of the metal layer 224. A width of the adhesion layer 222 may be substantially the same as a width of the protecting layer 226. A width of the protecting layer 226 may be substantially the same as a width of the metal layer 224. A length of the adhesion layer 222, the metal layer 224 or the protecting layer 226 may be about 0.1 µm about to 100 µm. A width of the adhesion layer 222, the metal layer 224 or the protecting layer 226 may be about 0.1 µM about to 100 µm.

The adhesion layer 222, the metal layer 224 and the protecting layer 226 may be arranged to have a mesh structure.

The transparent electrodes 220 may have transmittance and may include a multi-layered structure including the adhesion layer 222, the metal layer 224 and the protecting layer 226. For example, the adhesion layer 222 may have a thickness of about 70 Å, the metal layer 224 may have a thickness of about 200 Å and the protecting layer 226 may have a thickness of about 70 Å. The multi-layered structure may have a sheet resistance of about 3.78 ohm/square.

The transparent electrodes 220 may have a relatively low sheet resistance and may have transmittance, the transparent electrodes 220 may serve as a transparent electrode layer in the display area DA of the touch screen panel 200 and may serve as a line layer in the peripheral area PA of the touch screen panel 200.

The transparent electrodes 220 may sense a variation of capacitance according to an input action or an event by a user. The transparent electrodes 220 may have a rectangular shape, a diamond shape or a square shape. The transparent electrodes 220 may have various shapes. For example, the shape of the transparent electrode 220 may depend on a shape of the touch screen panel 200.

According to an exemplary embodiment of the inventive concept, a metal layer is disposed between an adhesion layer and a protecting layer including metal oxide. In this case, corrosion of metals may be prevented.

According to an exemplary embodiment of the inventive concept, a thickness of the metal layer disposed between the adhesion layer and the protecting layer including metal oxide may be increased. In this case, a resistance may be reduced and driving characteristics may be improved.

According to an exemplary embodiment of the inventive concept, a touch screen panel manufactured with the metal layer between the adhesion layer and the protecting layer including metal oxide may have increased transmittance and better performance.

While the inventive concept has been particularly shown and described with reference to exemplary embodiments thereof, it will be understood by those of ordinary skill in the art that various changes in form and detail may be made therein without departing from the spirit and scope of the inventive concept as defined by the following claims.

What is claimed is:

1. A touch screen panel, comprising:
  a substrate; and
  a transparent electrode disposed on a display area of the substrate, the transparent electrode comprising an adhesion layer, a metal layer disposed on the adhesion layer and a protecting layer disposed on the metal layer,
  wherein a thickness of the metal layer is about 150 Å to about 250 Å,
  wherein a thickness of the adhesion layer or a thickness of the protecting layer is about 50 Å to about 140 Å,
  wherein the protecting layer is disposed on an upper surface of the metal layer and a side surface of the metal layer, and
  wherein the side surface of the metal layer is coincident with a side surface of the adhesion layer.

2. The touch screen panel of claim 1, wherein the adhesion layer and the protecting layer each comprise the same material.

3. The touch screen panel of claim 1, wherein a length of the adhesion layer is substantially the same as a length of the protecting layer, and a width of the adhesion layer is substantially the same as a width of the protecting layer.

4. The touch screen panel of claim 1, wherein the adhesion layer and the protecting layer each comprise indium tin oxide (ITO), zinc tin oxide (ZTO), gallium zinc oxide (GZO), a carbon nano tube (CNT) or graphene.

5. The touch screen panel of claim 1, wherein the metal layer comprises aluminum (Al), gold (Au), silver (Ag), copper (Cu), chrome (Cr), molybdenum (Mo), iron (Fe), a molybdenum tungsten (MoW) alloy or nickel (Ni).

6. The touch screen panel of claim 1, wherein the transparent electrode comprises:
  a plurality of sensing patterns arranged on the substrate; and
  a plurality of connecting patterns,
  wherein two sensing patterns of the plurality of sensing patterns are connected to at least one connecting pattern of the plurality of connecting patterns.

7. The touch screen panel of claim 6, wherein at least one of the sensing patterns has a rectangular shape, a diamond shape or a square shape.

8. The touch screen panel of claim 1, further comprising:
  a line connected to the transparent electrode,
  wherein the line is disposed on a peripheral area adjacent to the display area of the substrate.

9. The touch screen panel of claim 1, wherein the substrate is a glass substrate comprising aluminosilicate or soda lime.

10. The touch screen panel of claim 1, wherein the substrate is a flexible substrate comprising transparent plastic or transparent ceramic.

11. The touch screen panel of claim 1, further comprising:
  a passivation layer disposed on a side of the adhesion layer, a side of the metal layer and a side of the protecting layer, wherein the side of the adhesion layer, the side of the metal layer and the side of the protecting layer form a side of the transparent electrode.

12. A touch screen panel, comprising:
  a substrate; and
  a transmitting electrode, the transmitting electrode including an adhesion layer disposed directly on the substrate, a metal layer disposed directly on the adhesion layer and a protecting layer disposed directly on the metal layer,
  wherein a thickness of the metal layer is about 200 Å and a thickness of each of the adhesion layer and the protecting layer is about 70 Å,
  wherein the protecting layer is disposed on an upper surface of the metal layer and a side surface of the metal layer, and
  wherein the side surface of the metal layer is coincident with a side surface of the adhesion layer.

13. The touch screen panel of claim 12, wherein the transmitting electrode functions as a line layer in a peripheral area of the touch screen panel, and wherein the line layer outputs an electric signal generated from another transparent electrode.

14. The touch screen panel of claim 12, wherein the adhesion layer includes indium tin oxide (ITO), the metal layer includes silver (Ag) and the protecting layer includes indium tin oxide (ITO).

* * * * *